(12) United States Patent
Kim et al.

(10) Patent No.: US 7,543,791 B2
(45) Date of Patent: Jun. 9, 2009

(54) TUNABLE INVERSE PENDULUM VIBRATION ISOLATION SYSTEM

(75) Inventors: Kyung-Suk Kim, Barrington, RI (US); Allan Rydberg, North Kingstown, RI (US)

(73) Assignee: Brown University, Providence, RI (US)

( * ) Notice: Subject to any disclaimer, the term of this patent is extended or adjusted under 35 U.S.C. 154(b) by 203 days.

(21) Appl. No.: 11/583,350

(22) Filed: Oct. 19, 2006

(65) Prior Publication Data

US 2007/0108366 A1  May 17, 2007

Related U.S. Application Data

(60) Provisional application No. 60/728,281, filed on Oct. 19, 2005.

(51) Int. Cl.
*F16M 13/00* (2006.01)
(52) U.S. Cl. .................. 248/550; 248/638; 248/664; 248/677
(58) Field of Classification Search ............... 248/550, 248/638, 664, 677
See application file for complete search history.

(56) References Cited

U.S. PATENT DOCUMENTS

| | | | | |
|---|---|---|---|---|
| 4,320,549 A | * | 3/1982 | Greb | 14/73.5 |
| 4,575,034 A | * | 3/1986 | Tobey | 248/188.9 |
| 4,582,291 A | * | 4/1986 | Matthews | 248/550 |
| 4,595,166 A | * | 6/1986 | Kurokawa | 248/559 |
| 5,072,801 A | * | 12/1991 | Freymann et al. | 180/68.5 |
| 5,310,156 A | * | 5/1994 | Matsumura et al. | 248/615 |
| 5,406,713 A | * | 4/1995 | Oman et al. | 33/366.12 |
| 5,573,212 A | * | 11/1996 | Palazzolo | 248/188.9 |
| 6,129,319 A | * | 10/2000 | Metelski | 248/123.2 |
| 6,138,979 A | * | 10/2000 | Morman | 248/638 |
| 6,209,841 B1 | * | 4/2001 | Houghton et al. | 248/550 |
| 6,631,593 B2 | * | 10/2003 | Kim | 52/167.9 |
| 7,114,692 B2 | * | 10/2006 | Sun et al. | 248/550 |
| 7,178,768 B2 | * | 2/2007 | Inoue | 248/188.4 |

\* cited by examiner

*Primary Examiner*—J. Allen Shriver, II
*Assistant Examiner*—Michael McDuffie
(74) *Attorney, Agent, or Firm*—Weingarten, Schurgin, Gagnebin & Lebovici LLP

(57) ABSTRACT

A vibration isolation system couples two resonant systems to provide isolation of transverse vibrational motions. The first system incorporates a plurality of tunable inverse pendulum assemblies. The second system incorporates a table of large mass suspended at several points from the inverse pendulum assemblies. The table is further suspended from the pendulum assemblies at each point via an assembly to isolate vertical vibrational motion.

12 Claims, 5 Drawing Sheets

TUNABLE INVERSE PENDULUM VIBRATION ISOLATION SYSTEM

CROSS REFERENCE TO RELATED APPLICATIONS

This application claims the benefit under 35 U.S.C. § 119(e) of U.S. Provisional Application No. 60/728,281, filed Oct. 19, 2005, the disclosure of which is incorporated by reference herein.

STATEMENT REGARDING FEDERALLY SPONSORED RESEARCH OR DEVELOPMENT

This invention was developed under National Science Foundation Contract Nos. NSF/CMS 0070057 and NSF/DMR 0079964. The federal government may have certain rights in this invention.

BACKGROUND OF THE INVENTION

The isolation of a table from building or floor vibrations is dependent upon the environment where the table is placed. A table on a high floor of a building may be primarily subject to the transverse sway of the building, while a table in the basement may see vertical floor vibrations from adjacent street traffic.

The legs of a vibration isolation table typically contain devices to reduce both the transverse and the vertical motion of the table top. Most of these devices are pneumatic. The techniques to limit the vertical motion usually employ inflated rubber bladders, elastic type materials, or active electronic circuits to sense and respond to vertical displacements. The techniques to limit transverse displacements usually employ a pendulum arrangement, elastic materials, or rubber bladders.

SUMMARY OF THE INVENTION

The present invention relates to a vibration isolation system in which two resonant systems are coupled to isolate an object or structure, such as equipment, a workpiece, a foundation, or the like, from transverse vibrational motions. The first system incorporates a plurality of tunable inverse pendulum assemblies each supported on the floor or ground via convexly curved feet that tend to rock when excited by transverse vibrations. The second system incorporates a table of large mass suspended at several points from the inverse pendulum assemblies. In conjunction with the coupled systems to isolate transverse vibrational motions, the table is suspended from the pendulum assemblies at each point via an assembly to isolate vertical vibrational motion, such as tension springs.

More particularly, each inverse pendulum assembly includes a base fixed to a floor or ground. A foot having a convexly curved lower surface is supported on the base for rocking motion when the base is subjected to a transverse vibrational excitation. An upstanding member extends upwardly from the base, and a mass is mounted on the upstanding member.

In the vibration isolation system, an inverse pendulum assembly is located at each of four table leg positions. A table of large mass is suspended from each inverse pendulum assembly. More particularly, the table is supported on two beams. The ends of the beams extend into housings of each inverse pendulum assembly, where the beam ends are suspended via cables from the pendulum assemblies. The cables are adjustable to allow the location of the center of mass within each pendulum assembly and the height of the table to be adjusted. The suspension point within each inverse pendulum assembly is adjustable to allow the natural frequency of the pendulum to be tuned.

DESCRIPTION OF THE DRAWINGS

The invention will be more fully understood from the following detailed description taken in conjunction with the accompanying drawings in which.

DETAILED DESCRIPTION OF THE INVENTION

The term "inverse or inverted pendulum" generally refers to a self-righting pendulum in which a rigid body extends upwardly from a supporting point from which the body is free to rotate about a horizontal axis or axes. The center of mass of the body is located above the supporting point, which is movable horizontally to attempt to maintain the body vertically upright in equilibrium.

Figure 1:
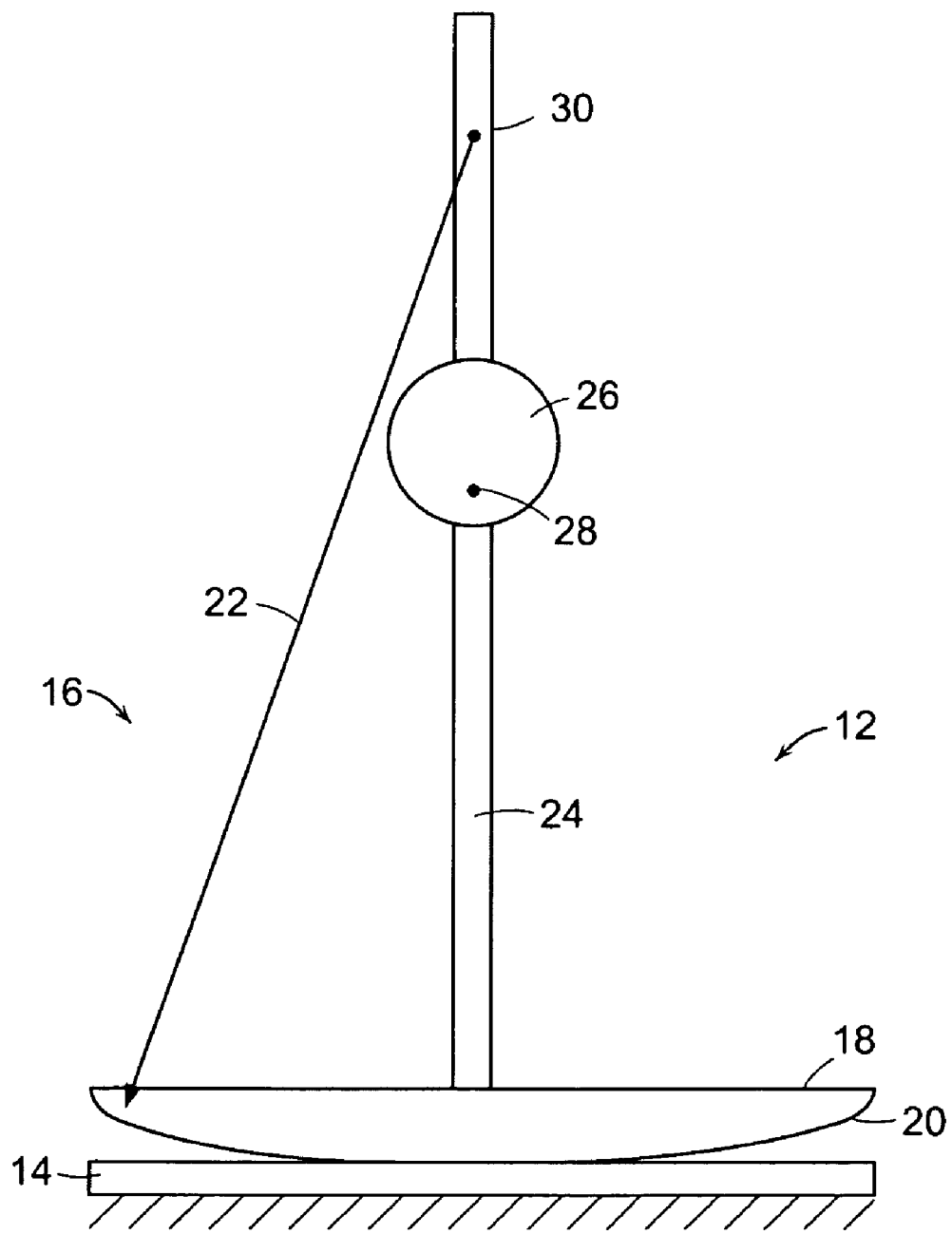
FIG. 1 is a schematic illustration of an inverse pendulum assembly of the present invention.
Figure 5:
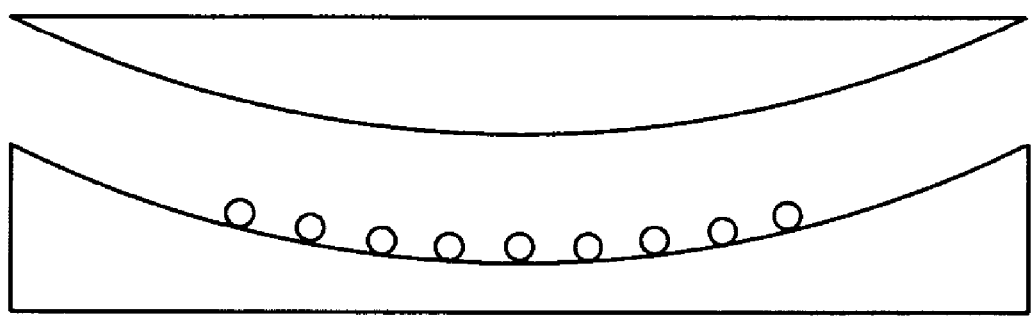
FIG. 5 is a schematic illustration of a further embodiment of an inverse pendulum assembly of the present invention.

An inverse pendulum assembly 12 of the present vibration isolation system is described with more particularity by reference to the schematic representation in FIG. 1. A base plate 14 is supported on and movable with the ground. A pendulum body 16 is supported on the base plate by a foot 18 that has a convexly curved bottom surface 20 having a radius of curvature 22. The pendulum body includes an upstanding member 24 such as a rod fixed to the foot and extending upwardly therefrom. A mass 26 is mounted on the upstanding member. The convex surface 20 is able to roll over the base plate 14 without sliding as the base plate translates horizontally. In another embodiment (see FIG. 5), the convex bottom surface of the foot can be supported with small diameter ball bearings contained in a matching concave depression in the base plate.

The stability of the pendulum assembly can be controlled by the placement of the center of mass 28 with respect to the center of curvature 30 of the foot 18. As long as the mass is below the center of curvature of this system, the system is stable. If the mass is above the center of curvature, the system becomes unstable. Thus, the system can provide an upside-down or inverse pendulum whose period may be lengthened by moving the center of mass closer to the center of curvature.

Figure 2:
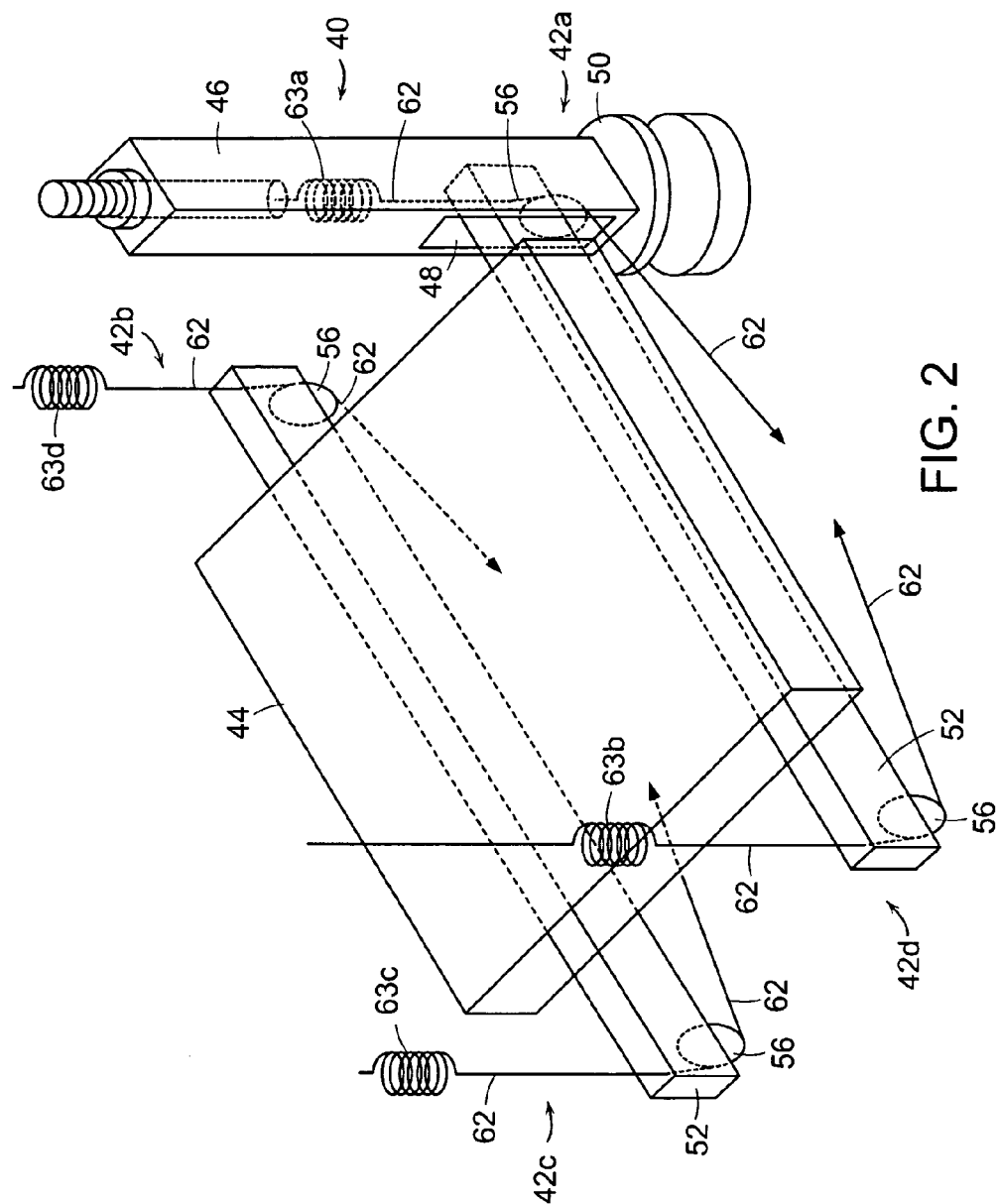
FIG. 2 is a schematic illustration of a vibration isolation system of the present invention.

Referring to FIG. 2, the present vibration isolation system incorporates an inverse pendulum assembly 40 located at each of four table leg positions 42a, 42b, 42c, 42d. A table 44 of large mass is suspended from each inverse pendulum assembly. (For clarity, only one pendulum assembly 40 at one leg position 42a is illustrated in FIG. 2.) More particularly in the embodiment illustrated, the upstanding member 46 of each pendulum assembly is configured as a hollow tube or housing having an opening 48 therein generally slightly above the foot 50. The openings are arranged in two pairs facing each other. The table 44, for example, a heavy floor material such as a massive slab of granite or another suitable material, is supported on two beams 52. The ends of the beams extend into the tubes 46 via the opposed openings 48.

The beams can be comprised of any suitable material, such as a metal. The table is suspended from the pendulum assembly at each end of the beams.

Figure 3:
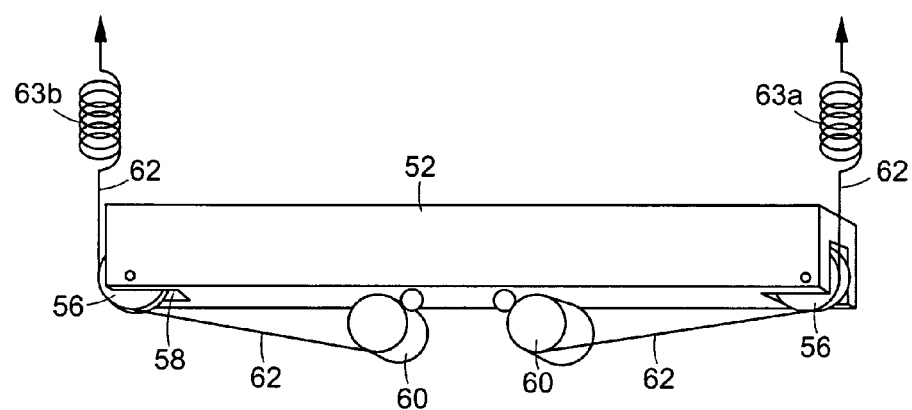
FIG. 3 is a schematic illustration of a beam supporting a table of the system of FIG. 2.

Referring also to FIG. 3, in one preferred embodiment, each beam 52 includes a pulley 56 fitted within a recess 58 at each end. A pair of winches 60 are mounted underneath and near the center of each beam. A cable 62 is wound at one end over each winch and passes over the pulley 56 at the end of the beam 52. The other end of the cable is attached to the pendulum assembly within the housing. The winches allow the height of the table above the floor to be adjusted by winding or unwinding the cable.

Figure 4:
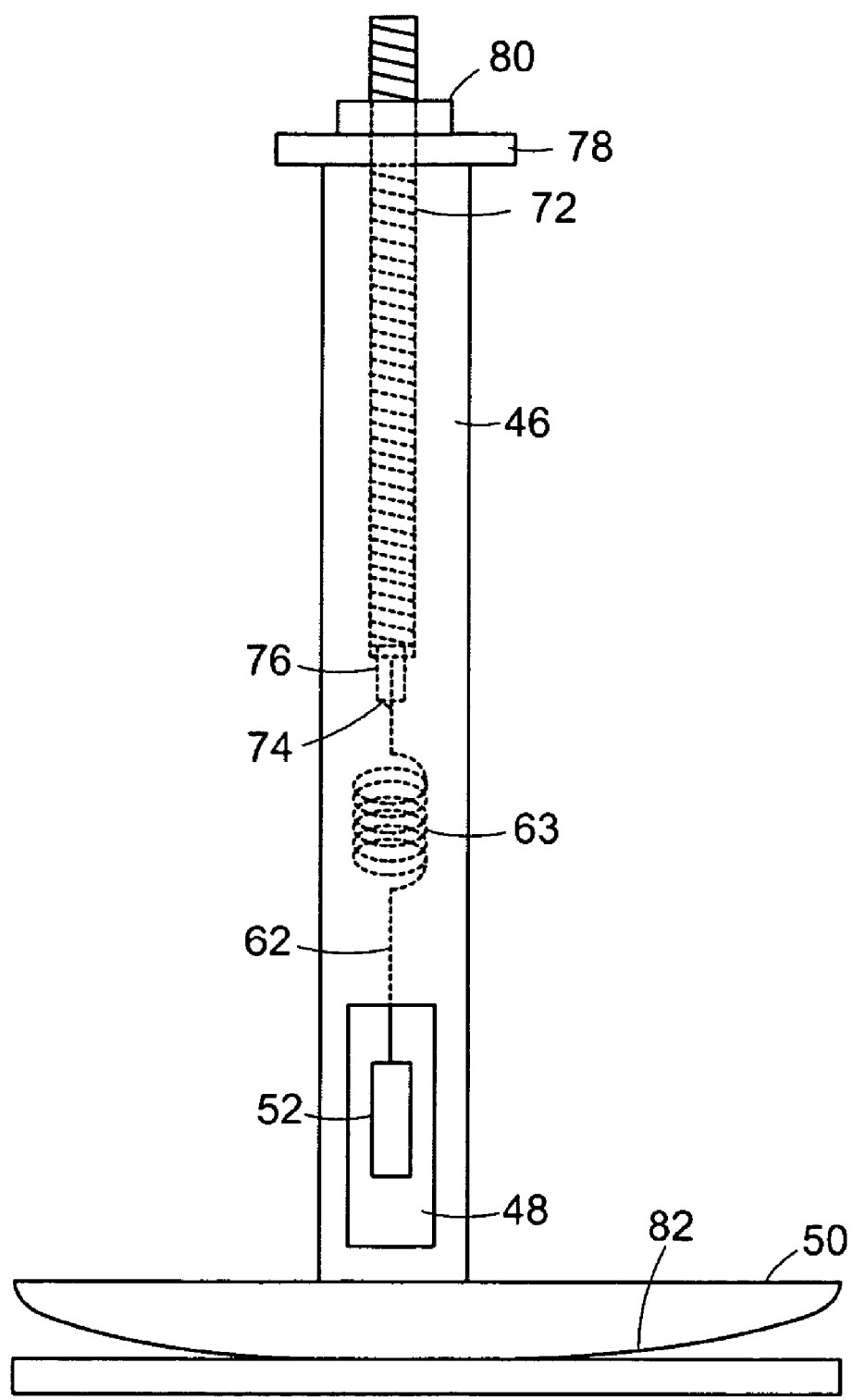
FIG. 4 is a schematic illustration of the inverse pendulum assembly of the system of FIG. 2.

Referring to FIG. 4, the housing 46 is placed so that the cable 62 extends along the central longitudinal axis of the housing. The cable extends up to a section of threaded rod 72. The cable is attached to a tension spring 63. At the spring suspension point 74, a swivel joint 76 is mounted between the cable and the threaded rod. The threaded rod passes through a top plate 78 of the housing. A nut 80 threaded onto the protruding rod enables the height of the suspension point to be adjusted. The height of the suspension point determines the length of the inverse pendulum, which is the distance between the effective mass center 28 and the rolling contact point of the foot surface 20. Thus, the natural frequency of the pendulum can be tuned by turning the nut to adjust the length of the inverse pendulum.

The effective center of mass of the pendulum assembly should be as close to the curvature center of the convex foot as possible, to maximize the inverse-pendulum length, without exceeding the length of the radius of curvature of the convex foot. Maximizing the inverse-pendulum length within the limit minimizes the cutoff frequency. However, if the inverse-pendulum length were greater than the radius of curvature, the system would be unstable.

In operation, as transverse motion of the floor moves the lower pads, the four feet tend to rock. The motion moves the four spring support points of the table minimally, which allows the table to move very slowly compared to the floor or ground motion. Preferably the convexly curved bottom surface is spherical, in which case the response of the system is identical in all directions. However, the surface could have a different curvature, such as an ellipsoid, which would provide a different response to transverse vibrations depending on the direction.

The present vibration isolation system is able to reduce the natural frequency of the system to less than most excitation frequencies, so that the table does not vibrate when subjected to the excitation vibrations. The present system can achieve in principle a cut off frequency of 0 Hz if the inverse-pendulum length is equal to the radius of curvature of the convex foot. The table would, however, over travel and encounter structural constraints, such as a wall, if this were the case. Thus, the pendulum length should be less but close to the radius of curvature without exceeding the radius of curvature. This minimizes the cutoff frequency, while maintaining stability of the table.

For example, using a radius of curvature of 48 inches and an inverse-pendulum length close to this, a cutoff frequency of 0.001 Hz (cycles per second) is possible. In typical prior art systems, the minimum cutoff frequency achievable is 0.1 Hz. This is because the length of a conventional pendulum must be impracticably large (tens of feet or more) to achieve lower frequencies; the constraint of the room dimensions in which the prior art system is housed limits the pendulum length to, for example, several feet.

The tension springs 63a, 63b, 63c, 63d aid in isolating the table from vertical vibrations. The vertical cutoff frequency of the system is proportional to the square root of the spring constant divided by the mass of the table. Thus, the larger the table mass is, the lower the vertical cutoff frequency is. Accordingly, the tension spring constant and mass of the table can be selected to minimize the response of the table to vertical vibrations, as would be appreciated by those of skill in the art.

The width dimension of the convex foot in plan view is selected to ensure that the ends of the beams do not extend beyond the edges of the convex foot during motion, or the pendulum assembly would become unstable and tip over. Generally, transverse building motion is on the order of an inch or several inches. Thus, a foot having a plan width dimension of one foot is typically sufficient. It will be appreciated that transverse building motion at the upper floors of super tall (e.g., one hundred story) buildings can be much larger, on the order of a few feet. In this case, the foot and housing of the upstanding member can be made larger if necessary to accommodate a table subject to such motions.

The table must be located high enough above the floor or ground to provide clearance for the winches. If a cable or tension spring were to break, the table would fall. Because the table is heavy, it could damage the floor or other structure if it fell a great distance. Thus, legs (not shown), of wood or another suitable material, are preferably located beneath the beams. The winches are used to raise the table a minimal distance, for example 0.5 inch, off the legs, so that the table can swing freely clear of the floor or ground. If the table should fall, it will land on the nearby legs, minimizing any damage.

Because the table is suspended close to the floor, any equipment, instrumentation or the like may be mounted in a suitably raised position on the table to a height that is more accessible by users. The isolation vibration system of the present invention is applicable to a variety of uses, such as vibration isolation tables, optical tables and earthquake-resistant foundations.

The invention is not to be limited by what has been particularly shown and described, except as indicated by the appended claims.

What is claimed is:

1. A vibration isolation system comprising:
   a mass, a support surface on the mass;
   the mass coupled to a plurality of inverse pendulum assemblies;
   each inverse pendulum assembly comprising a center of mass supported by a rigid body extending upwardly from a supporting point in rolling contact with a base, the rigid body free to rotate about a transverse axis, the center of mass comprising a portion of the mass suspended from the rigid body of a respective inverse pendulum assembly above the base;
   each inverse pendulum assembly further comprising a foot comprising a convexly curved surface rotatably supported on the base; and
   wherein the rigid body each inverse pendulum assembly further comprises a housing extending upwardly from the foot, the center of mass suspended from a suspension point at an upper portion of the housing, wherein the effective center of mass at each inverse pendulum assembly is located below and close to the curvature center of the foot.

2. The system of claim 1, wherein the mass comprises a table.

3. The system of claim 1, wherein the mass comprises a granite slab.

4. The system of claim 1, wherein the mass is supported on two beams, each beam extending at opposed ends into a respective inverse pendulum assembly, each beam end suspended from the respective inverse pendulum assembly.

5. The system of claim 4, wherein each beam end is suspended from a cable from the respective inverse pendulum assembly.

6. The system of claim 5, wherein the cable length is adjustable to adjust the location of the effective center of mass of the respective inverse pendulum assembly.

7. The system of claim 6, wherein the cable is windable on a winch mounted on the beam to adjust the cable length.

8. The system of claim 1, wherein:
the mass is supported on two beams, each beam extending at opposed ends into an opening in the housing of a respective inverse pendulum assembly, each beam end suspended from a suspension point at an upper portion of the housing.

9. The system of claim 1, wherein the base comprises a flat surface.

10. The assembly of claim 1, wherein the base comprises a concavely curved surface.

11. The system of claim 1, wherein the effective center of mass is suspended from a vertical vibrational isolation mechanism within each inverse pendulum assembly.

12. The system of claim 11, wherein the vertical vibrational isolation mechanism comprises a tension spring.

* * * * *